April 12, 1938.                     L. F. BAASH                          2,113,821
                                    SAFETY JOINT
                                 Filed Feb. 24, 1936
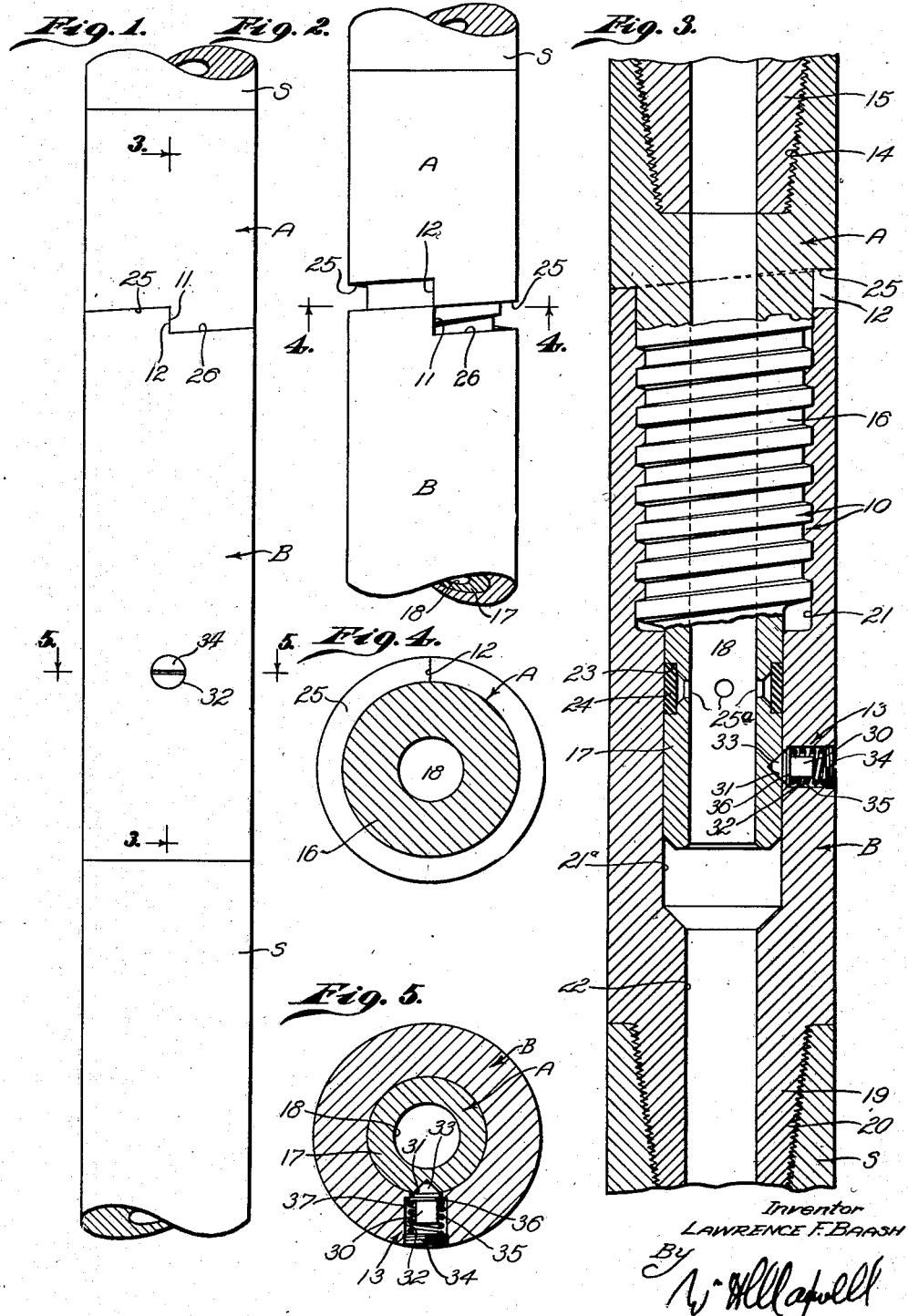
Inventor
LAWRENCE F. BAASH
By
His Attorney Patented Apr. 12, 1938

2,113,821

UNITED STATES PATENT OFFICE 2,113,821

SAFETY JOINT

Lawrence F. Baash, Los Angeles, Calif.

Application February 24, 1936, Serial No. 65,264

9 Claims. (Cl. 255—28)

This invention relates to a connection or joint and relates more particularly to a safety joint for use in a well drilling string. A general object of this invention is to provide a practical, effective and dependable safety joint.

Another object of this invention is to provide a safety joint for use in a string of well drilling equipment that is capable of dependably transmitting rotation and longitudinal forces during drilling and other operations and that may be easily released or disconnected when desired or necessary.

Another object of this invention is to provide a safety joint of the character mentioned that may be readily released or disconnected when connected in a drilling string in a well bore by merely turning the string in a reverse or left hand direction.

Another object of this invention is to provide a safety joint that will not become loosened or disconnected by back-lash or relatively unresisted reverse rotation of the drilling string.

Another object of this invention is to provide a safety joint of the character mentioned that cannot become excessively tightened or jammed by the application or transmission of heavy forward rotational forces or by heavy longitudinal strains and, therefore, may be easily released at any time.

Another object of this invention is to provide a safety joint of the character mentioned whose release or disconnection is controlled so that it cannot be released by unintentional or unavoidable reverse rotation but may be easily released by the positive application of reverse torque of a known magnitude followed by reverse rotation of the string.

Another object of this invention is to provide a safety joint that embodies a novel spring urged control pin or detent normally resisting disconnection of the joint sections and that releases or yields only upon subjecting the joint to a reverse torque of a known or predetermined magnitude.

A further object of this invention is to provide an improved safety joint of the character mentioned that is simple and inexpensive.

The various objects and features of my invention will be fully understood from the following detailed description of a typical preferred form and application of my invention, throughout which description reference is made to the accompanying drawing, in which:

Fig. 1 is a side elevation of the safety joint provided by this invention fully made up or connected. Fig. 2 is a fragmentary side elevation of the safety joint showing the stop shoulders in the released condition. Fig. 3 is an enlarged longitudinal detailed sectional view taken as indicated by line 3—3 on Fig. 1 and Figs. 4 and 5 are enlarged transverse detailed sectional views taken as indicated by line 4—4 on Fig. 2 and line 5—5 on Fig. 1, respectively.

The improved safety joint of this invention includes, generally, two sections A and B having cooperating threads 10, shoulders 11 and 12 on the sections A and B, respectively, definitely limiting threading together of the sections and control means or detent means 13 resisting or controlling unthreading of the sections A and B.

The sections A and B are adapted to be connected with parts or members of a well drilling string S to form a connection between them. The joint sections A and B are elongate parts and are telescopically assembled one section being an inner part and the other section being an outer part. In the particular relationship illustrated the section A is the upper section of the joint and constitutes the inner part of the joint while the section B is the lower part and forms the outer part of the joint. It will be obvious that the positioning of the sections A and B illustrated in the drawing may be reversed. The section A is provided at its upper or outer end with means for connection with the string S. In the case illustrated a tapered socket 14 is provided in the upper or outer end of the section A to receive a threaded pin 15 on a tool joint section or other part of the string S. The upper or outer exposed portion of the section A may be cylindrical and of the same diameter as the adjacent part of the string S. The major intermediate portion of the joint section A is reduced in diameter being in the nature of a stem 16. The stem 16 carries a thread 10. The thread 10 is coarse or heavy and has a substantial pitch or lead. The inner or lower portion 17 of the stem 16 is reduced in diameter and is preferably cylindrical. A central longitudinal fluid passage 18 extends longitudinally through the section A from the bottom of the socket 14 to the end of the stem portion 17.

The section B is formed to receive the stem 16 of the section A and is provided at its lower or outer end with means for connecting the string S. In the particular embodiment of the invention shown in the drawing a tapered pin 19 is provided on the lower or outer end of the section B to thread in a socket 20 in a tool joint section or other part of the string S. The joint section B may be cylindrical in its external configuration and may be of substantially the same diameter as the exposed portion of the section A and the adjacent members of the string S. A socket or opening 21 extends longitudinally through the section B from its upper or inner end. The opening 21 is provided to receive the stem 16 of the section A and has a thread 10 on its wall for cooperating with the thread 10 of the stem 16. The opening 21 has a reduced inner or lower portion 21ª for receiving the portion 17 of the stem 16. A fluid passage 22 continues downwardly or outwardly from the opening portion 21ª to conduct the circulation fluid to the adjacent member of the string S.

Packing means may be provided for sealing between the joint sections A and B to prevent the leakage of circulation fluid from the passages 18 and 22. An annular groove 23 is provided in the portion 17 of the stem 16 and carries a ring 24 of rubber or other suitable packing material. Ports 25ª are provided in the stem portion 17 to extend outwardly from the passage 18 to the groove 23 so that the inner surface of the packing ring 24 is subjected to the action of the fluid pressure in the passage which urges the packing ring 24 into tight sealing cooperation with the wall of the opening portion 21ª. The fluid pressure actuated packing ring 24 effectively prevents the outward leakage of the circulation fluid and, therefore, prevents erosion or cutting action of the parts.

The shoulders 11 and 12 for limiting the threading together of the joint sections may be provided on any suitable convenient or practical opposing faces or parts of the joint sections. In the typical preferred embodiment of the invention illustrated in the drawing the shoulder 11 occurs on the upper or inner end of the section B and the section 12 is provided on the section A at the upper or outer end of its stem 16. The stem 16 being reduced in diameter provides the section A with an annular downwardly facing shoulder or surface 25. The shoulder 12 is provided on the wall or surface 25. The shoulders 11 and 12 are positioned to oppose or face one another and their engagement definitely limits the threading together of the sections A and B. The shoulder 12 on the section A faces forwardly or in the direction of turning of the section A required to thread its stem 16 in the opening 21, while the shoulder 11 on the section B faces in the opposite direction. The shoulders 11 and 12 are preferably substantially vertical or in a plane extending longitudinally of the joint. In order to provide for the proper cooperation of the shoulders 11 and 12 the inner or upper end 26 of the section B and the surface 25 of the section A are helicoidally pitched or spiralled to be continuous surfaces terminating at the bases and upper ends of the shoulders 11 and 12. The surfaces 25 and 26 are pitched in the same direction as the threads 10 and have substantially the same lead or degree of pitch as the threads 10. The shoulders 11 and 12 are positioned and related to cooperate to prevent further threading together of the sections A and B before the threads 10 are fully tightened down or tightly engaged. The shoulders 11 and 12 are of such extent that the surfaces 25 and 26 are in engagement or immediately adjacent one another when the shoulders 11 and 12 are in engagement and are free to pass one another, as shown in Fig. 2, upon the completion of one revolution between the sections A and B in the thread-loosening direction.

The control means or detent means 13 is an important feature of the present invention and together with the shoulders 11 and 12 assures the dependable operation and release of the safety joint. The control means 13 operates to yieldingly resist unthreading of the sections A and B so that the joint does not become loosened during operation of the string S and can only be disconnected by intentional positive turning of the string S in the thread loosening direction.

The means 13 includes a spring pressed latch pin or detent 30 on one section of the joint for cooperating with a recess or socket 31 in the other section. In the particular form of the invention illustrated the detent 30 is provided on the joint section B and the socket 31 is provided in the section A, it being understood that this relationship between the detent and socket may be reversed if desired. A lateral or radial opening 32 is provided in the wall of the section B to carry the detent 30. The opening 32 extends through the wall of the section B to communicate with the inner portion 21ª of the opening 21. The detent 30 is in the nature of a control pin having a head 30 adapted to project from the opening 32 to cooperate with the socket 31. In accordance with the invention the head 33 of the detent 30 is tapered or conical. The extreme outer end of the head 33 may be flat so that particles of dirt in the socket 31 will not prevent the proper cooperation between the head and socket. The recess or socket 31 is shaped to accurately or properly receive the head 33 of the detent 30. The recess or socket 31 is conical or of inwardly diminishing cross section and is proportioned so that the detent head 33 has substantially even cooperation with its wall.

Spring means is provided to urge the detent 30 inwardly so that its head 33 forcibly cooperates with the socket 31. A plug 34 is threaded in the outer portion of the opening 32 and a spring 35 is arranged in the opening 32 under compression between the plug 34 and a suitable flange 36 on the detent 30. The spring 35 is sufficiently strong to urge the detent head 33 into firm cooperation with the socket 31. The flange 36 is adapted to cooperate with a shoulder 37 on the wall of the opening 32 to prevent inward displacement and loss of the detent 30 when the joint is disconnected. The strength of the spring 35, the size of the detent head 33 and the socket 31 and the taper of the head 33 and the socket wall determine the reverse torque necessary to release the detent head from the recess and initial unthreading of the threads 10. The detent 30 and the socket 31 are positioned and related to fully cooperate when the shoulders 11 and 12 are in engagement so that there is no slack or play in the joint when the joint is fully made up.

In the use or operation of the safety joint provided by this invention the parts are assembled as illustrated in Fig. 3 of the drawing and the joint is connected in the string S as shown in Fig. 1 of the drawing. When the parts are properly assembled the shoulders 11 and 12 are in engagement and the detent head 33 is bearing in the tapered socket 31. When the string S is rotated or otherwise manipulated in the well bore the shoulders 11 and 12 cooperate for the positive transmission of forward or righthand rotative forces and their engagement prevents tightening or jamming of the threads 10 by such forces. The surfaces 25 and 26 may cooperate for the transmission of compression strains to relieve the threads 10. The threads 10, of course, effectively transmit tensile strains during raising of the string S and similar operations. The head 33 of the spring urged detent 30 cooperates with the socket 31 to dependably resist loosening or unthreading of the joint during operation or manipulation of the string S. The head 33 is forced into the socket 31 with sufficient pressure to dependably prevent loosening or unthreading of the sections A and B due to backlash in the drilling string and prevent unthreading of the joint when the string is turned under little torque to operate and control certain well tools. The circulation fluid is free to pass downwardly through the joint with a minimum resistance and turbulence and is prevented from leaking between the sections A and B by the fluid pressure actuated packing ring 24. As the threads 10 are not subjected to the tightening action of forward torque and compression strains they do not become jammed or strained.

When it becomes desirable or necessary to release or disconnect the safety joint the string S is turned in a direction to unthread the threads 10. The cooperation of the detent head 33 with the socket 31 may resist this rotative force until sufficient torque has built up in the string to overcome the action of the spring 35. In practice the degree of torque or rotative force necessary to release the detent 30 may be known or determined so that the safety joint may be readily disconnected when desired. It is believed that it will be apparent how relative turning between the sections A and B in a direction to unthread the threads 10 causes slippage between the surface of the tapered detent head 33 and the wall of the tapered socket 31 which slippage results in retraction of the detent 30 in the opening 32. Following retraction of the detent head 33 from the socket 31 the sections A and B may be readily unthreaded. With the particular arrangement of parts illustrated in the drawing the stem 16 of the section A may be readily threaded upwardly out of the opening 21. Following the unthreading or disconnection of the sections A and B the portion of the drilling string S above the joint may be removed from the well, together with one of the sections A or B.

Having described only a typical preferred form and application of my invention I do not wish to be limited or restricted to the specific details herein set forth, but wish to reserve to myself any variations or modifications that may appear to those skilled in the art or fall within the scope of the following claims.

Having described my invention, I claim:

1. A safety joint comprising, two threadedly connected sections, an opening in one section, a spring pressed member carried by the other section cooperating with the opening to offer substantial resistance to unthreading of the sections, the cooperating surface of the member and the wall of the opening being pitched to cause retraction of the member when torque of a certain magnitude is applied to the sections in the unthreading direction, and shoulders on the sections extending substantially longitudinally thereof to limit threading together of the sections in relative positions where the member is receivable in the opening.

2. A safety joint comprising, two threadedly connected sections, shoulders on the sections engageable to definitely limit threading together of the sections, an opening in one section spaced from the shoulders, and a spring pressed member carried by the other section to cooperate with the opening when the shoulders are in engagement to offer substantial resistance to unthreading of the sections, the cooperating surface of the member and the wall of the opening being pitched to cause retraction of the member when torque of a certain magnitude is applied to the sections in the unthreading direction.

3. A safety joint comprising, two threadedly connected sections, an opening in one section, shoulders on the sections spaced from the opening and cooperable to limit threading together of the sections, and a retractile detent on the other section related to the shoulders to cooperate with the opening to yieldingly resist unthreading of the sections when the shoulders are in cooperation.

4. A safety joint comprising, two threadedly connected sections, abutments on the sections limiting threading together of the sections, and detent means remote from the abutments for yieldingly resisting unthreading of the sections when the abutments are in cooperation.

5. A safety joint comprising, a section having an opening, a section having a stem threaded in the opening, shoulders on the sections limiting threading of the stem in the opening, there being a socket in the outer periphery of the stem and spaced from said shoulders, and a retractile spring pressed detent on the first mentioned section cooperating with the socket when the shoulders are in cooperation to yieldingly resist unthreading of the stem from the socket.

6. A safety joint comprising, a section having an opening, a section having a stem threaded in the opening, opposing surfaces on the sections, shoulders on said surfaces extending longitudinally of the sections cooperable to limit threading of the stem in the socket, there being a socket in the stem, and a spring pressed member on the first mentioned section releasably cooperating with the socket to yieldingly resist unthreading of the stem from the socket and retractable from the socket by a substantial unthreading force.

7. A safety joint comprising, a section having an opening, a section having a stem threaded in the opening, opposing helical surfaces on the sections terminating in axially extending shoulders cooperable to limit threading of the stem in the socket, there being a tapered socket in the stem, a spring urged member on the first named section, and a tapered head on the member cooperating with the socket to resist unthreading of the stem and retractile from the socket by a known torque on the sections.

8. A safety joint comprising, two threaded together sections, parts on the sections for definitely limiting threading together of the sections, and a shiftable detent on one section at a point remote from said parts cooperating with the other section to offer resistance to unthreading of the sections and retractable by substantial torque applied to the sections in the thread loosening direction.

9. A safety joint comprising, two threaded together sections, axial shoulders on the sections limiting threading together of the sections, a retractable detent on one section remote from said shoulders, and surfaces on the detent and said other section engaging to offer substantial resistance to unthreading of the sections when the shoulders are in cooperation and cooperable to cause retraction of the detent under a definite thread loosening torque on the sections.

LAWRENCE F. BAASH.